(No Model.)

M. H. RISSER.
THILL COUPLING BOLT.

No. 470,507.  Patented Mar. 8, 1892.

Witnesses
Samuel Ker
Philip C. Masi

Inventor
Morris H. Risser
by E. W. Anderson
his Attorney

UNITED STATES PATENT OFFICE.

MORRIS HENRY RISSER, OF ASHLAND, OHIO.

THILL-COUPLING BOLT.

SPECIFICATION forming part of Letters Patent No. 470,507, dated March 8, 1892.

Application filed October 31, 1891. Serial No. 410,498. (No model.)

*To all whom it may concern:*

Be it known that I, MORRIS HENRY RISSER, a citizen of the United States, and a resident of Ashland, in the county of Ashland and State of Ohio, have invented certain new and useful Improvements in Spring-Bolts; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
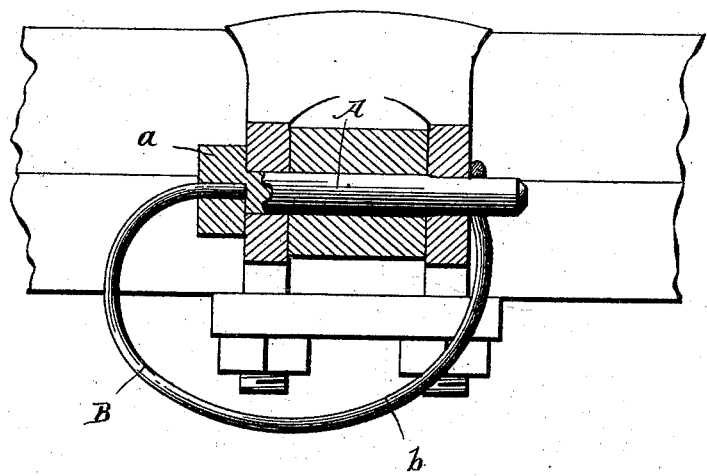
Figure 2:
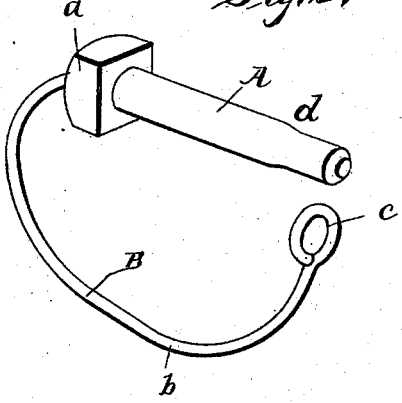

Figure 1 of the drawings is a front view, partly in section, applied to shaft-coupling. Fig. 2 is a perspective view of the invention.

This invention has relation to spring-pins or pivot-bolts for thill-couplings, and particularly to an improvement claimed by me in my patent, No. 216,458, granted June 10, 1879; and the invention consists in the novel construction and combination of parts, as hereinafter specified.

In the accompanying drawings, the letter A designates the pin, having a smooth cylindrical bearing-surface and provided with a head *a*, which may be either angular or circular.

B designates the spring, which consists of a piece of spring-wire made fast to the head at one end and formed into a bow or loop *b* underneath the bolt. At its opposite end it is formed into an eye *c*, which is designed to engage the end of the bolt. The spring B is made fast to the head of the bolt or pin by drilling a hole therein of less diameter than that of the wire. The head of the pin or bolt is then heated and shrunk on the wire. If desired, the end of the bolt may be rabbeted or shouldered, as shown at *d*, to receive said eye; but this is not necessary in all cases. In putting the bolt in place the eye *c* is sprung out of engagement therewith and the bolt is slipped through the ears of the clip and through the bearing of the thill-iron. Said eye is then sprung back into engagement with the bolt.

The wire spring above described is superior to the enlarged or band spring shown in my patent above referred to in that it does not collect and retain mud, as does the band-spring, the latter forming a pocket, which soon becomes filled with mud and dirt. It is also lighter, neater in appearance, and can be manufactured at a lower cost.

In the case of the bolt shown in my former patent it was necessary to form the bolt of steel for the reason that the broad band-spring was formed integral therewith. In the present case an ordinary bolt may be employed and a piece of wire of the requisite spring character attached thereto by drilling a hole in the head, as above described.

Having described this invention, what I claim as new, and desire to secure by Letters Patent, is—

1. The herein-described spring-bolt, comprising a headed bolt having a spring B secured thereto, said spring comprising an independent piece of cylindrical spring-wire secured at one end in said head, formed into a loop or bow, and having an eye *c* at its free end adapted to engage the opposite end of said bolt, substantially as specified.

2. The herein-described spring-bolt, comprising the cylindrical shank having the head formed on one end thereof and at its opposite end rabbeted or reduced, and a spring consisting of a piece of wire made fast at one end in said head, formed into a bow or loop underneath said shank, and provided with an eye at its free end adapted to be sprung into and out of engagement with said rabbeted or reduced portion, substantially as specified.

In testimony whereof I affix my signature in presence of two witnesses.

MORRIS HENRY RISSER.

Witnesses:
J. D. JONES,
CYRUS PLANK.